United States Patent
Chen (10) Patent No.: US 12,237,698 B2
(45) Date of Patent: Feb. 25, 2025

(54) METHOD FOR OVERCURRENT REGULATION OF ENERGY STORAGE SYSTEM AND ENERGY STORAGE SYSTEM

(71) Applicant: CONTEMPORARY AMPEREX TECHNOLOGY (HONG KONG) LIMITED, Hong Kong (CN)

(72) Inventor: Chengjie Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/676,820

(22) Filed: May 29, 2024

(65) Prior Publication Data

US 2024/0313550 A1  Sep. 19, 2024

Related U.S. Application Data

(63) Continuation of application No. PCT/CN2021/142589, filed on Dec. 29, 2021.

(51) Int. Cl.
*H02J 7/00* (2006.01)
*H02J 7/14* (2006.01)

(52) U.S. Cl.
CPC ...... *H02J 7/00304* (2020.01); *H02J 7/00714* (2020.01)

(58) Field of Classification Search
CPC ... H02J 7/00304; H02J 7/00714; H02J 7/0014
See application file for complete search history.

(56) References Cited

U.S. PATENT DOCUMENTS

| | | | | |
|---|---|---|---|---|
| 6,388,423 | B1* | 5/2002 | Schilleci, Jr. ......... | H02J 7/0014 320/122 |
| 2003/0102871 | A1* | 6/2003 | Yudahira ............ | G01R 31/3828 320/132 |
| 2005/0156566 | A1* | 7/2005 | Thorsoe .............. | H02J 7/00302 320/116 |

(Continued)

FOREIGN PATENT DOCUMENTS

| | | |
|---|---|---|
| CN | 202206168 U | 4/2012 |
| CN | 104184132 A | 12/2014 |

(Continued)

OTHER PUBLICATIONS

The World Intellectual Property Organization (WIPO) International Search Report and Written Opinion for PCT/CN2021/142589 Oct. 10, 2022 14 Pages (including translation).

(Continued)

*Primary Examiner* — Alexis B Pacheco
(74) *Attorney, Agent, or Firm* — Anova Law Group, PLLC

(57) ABSTRACT

A method for overcurrent regulation of an energy storage system includes: obtaining a current value and overcurrent capability of each battery cluster in a plurality of battery clusters; determining an overcurrent value of each battery cluster according to the current value and the overcurrent capability; determining the maximum overcurrent value from overcurrent values of a plurality of the battery clusters; and regulating a total current limit value of the energy storage system according to the maximum overcurrent value.

16 Claims, 7 Drawing Sheets

100

(56) References Cited

U.S. PATENT DOCUMENTS

| | | | | |
|---|---|---|---|---|
| 2008/0018299 A1* | 1/2008 | Renda | ............... | B60L 58/19 320/116 |
| 2009/0243540 A1* | 10/2009 | Choi | ............... | H02J 7/007194 320/150 |
| 2010/0001737 A1* | 1/2010 | Kubo | ............... | H02J 7/0013 324/434 |
| 2010/0079108 A1* | 4/2010 | Monden | ............... | H01M 10/48 320/134 |
| 2011/0127964 A1* | 6/2011 | Nishida | ............... | H01M 10/44 320/118 |
| 2011/0215760 A1* | 9/2011 | van Lammeren | ............... | H02J 7/0014 320/116 |
| 2012/0091964 A1* | 4/2012 | Vance | ............... | B60L 3/0046 320/122 |
| 2012/0104856 A1* | 5/2012 | Gottlieb | ............... | H02J 1/10 307/66 |
| 2012/0326671 A1* | 12/2012 | Krause | ............... | H01M 10/482 320/126 |
| 2013/0154567 A1* | 6/2013 | Peterson | ............... | H02J 7/0025 320/126 |
| 2014/0147711 A1* | 5/2014 | Takeda | ............... | H02J 7/0024 429/61 |
| 2014/0197795 A1* | 7/2014 | Crebier | ............... | H02J 7/0018 307/77 |
| 2014/0239910 A1* | 8/2014 | Tsai | ............... | H02J 7/0014 320/134 |
| 2015/0048795 A1* | 2/2015 | Hashimoto | ............... | H02J 7/0034 320/126 |
| 2015/0380952 A1* | 12/2015 | Brandt | ............... | H01M 10/482 320/118 |
| 2018/0043789 A1* | 2/2018 | Goetz | ............... | B60L 58/22 |
| 2018/0198289 A1* | 7/2018 | Sugeno | ............... | H02J 7/007182 |
| 2021/0399554 A1* | 12/2021 | Sherstyuk | ............... | H02J 7/0014 |

FOREIGN PATENT DOCUMENTS

| | | |
|---|---|---|
| CN | 107292437 A | 10/2017 |
| CN | 107918046 A | 4/2018 |
| CN | 111446752 A | 7/2020 |
| CN | 110912235 B | 11/2021 |
| JP | 2020162271 A | 10/2020 |
| JP | 2020198723 A | 12/2020 |
| WO | 2011122696 A1 | 10/2011 |
| WO | 2013161512 A1 | 12/2015 |

OTHER PUBLICATIONS

The Japan Patent Office (JPO) Notice of Reasons for Refusal for Application No. 2024-525289 Nov. 5, 2024 5 Pages (including translation).

* cited by examiner

METHOD FOR OVERCURRENT REGULATION OF ENERGY STORAGE SYSTEM AND ENERGY STORAGE SYSTEM

CROSS-REFERENCE TO RELATED APPLICATION

This application is a continuation of International Application No. PCT/CN2021/142589, filed on Dec. 29, 2021, the entire content of which is incorporated herein by reference.

TECHNICAL FIELD

The present application relates to the technical field of energy storage, in particular to an energy storage system and a method for overcurrent regulation of an energy storage system.

BACKGROUND ART

In an energy storage system, various battery clusters are connected in parallel, and due to different internal resistances of the battery clusters, the current during its charging and discharging processes is different. Severe current imbalance of the battery clusters can cause the current of the battery cluster with a lower internal resistance to be higher, which can easily trigger overcurrent and cause the battery cluster to operate in an overcurrent state for a long time, increasing the risk of lithium precipitation in battery cells.

Therefore, how to effectively solve the problem of overcurrent of an energy storage system is currently an urgent issue that needs to be addressed.

SUMMARY

The present application provides an energy storage system and a method for overcurrent regulation of an energy storage system, which can dynamically regulate the current of the energy storage system and effectively solve the problem of overcurrent of the energy storage system.

In a first aspect, provided is a method for overcurrent regulation of an energy storage system, the energy storage system comprising a plurality of battery clusters connected in parallel, and the method comprising: obtaining a current value and overcurrent capability of each battery cluster in the plurality of battery clusters; determining an overcurrent value of each battery cluster according to the current value and the overcurrent capability; determining the maximum overcurrent value from the overcurrent values of the plurality of battery clusters; and regulating a total current limit value of the energy storage system according to the maximum overcurrent value.

In the present application, the overcurrent value of the battery cluster is determined by the current value and the overcurrent capability of the battery cluster, the maximum value of the overcurrent values of the plurality of battery clusters is taken as the maximum overcurrent value, and the total current limit value of the energy storage system is regulated according to the maximum overcurrent value. This can timely regulate the total current limit value of the energy storage system when the maximum overcurrent value is large, avoid an overcurrent damage to the battery cluster of the energy storage system due to an excessive current, and thus protect the safe operation of the battery cluster of the energy storage system. At the same time, this method of regulating the total current limit value of the energy storage system according to the maximum overcurrent value to solve the problem of overcurrent does not require an additional hardware to regulate and control the battery cluster in each branch separately, reducing the integration cost of the system, and effectively solving the problem of overcurrent of the energy storage system.

In a possible implementation, regulating a total current limit value of the energy storage system according to the maximum overcurrent value comprises: if the maximum overcurrent value is greater than a first threshold, lowering the total current limit value, wherein the first threshold is a preset value greater than zero.

The setting of the first threshold can enable the lowering of the total current limit value of the energy storage system if the maximum overcurrent value of the energy storage system exceeds the first threshold, thereby achieving overcurrent protection of the energy storage system.

In a possible implementation, lowering the total current limit value comprises: stepwise lowering the total current limit value until the maximum overcurrent value is not greater than a second threshold, wherein the second threshold is less than the preset value of the first threshold.

In the implementation of lowering the total current limit value, a stepwise lowering method is used, so that the total current limit value of the energy storage system can be stepwise lowered, avoiding rapid lowering of the total current limit value and causing damage to the performance of the battery cluster due to a rapid change of current in the energy storage system. As the total current limit value is reduced, the maximum overcurrent value computed in real-time is also gradually reduced. Setting up the second threshold can stop lowering the total current limit value if the maximum overcurrent value is less than or equal to the second threshold. This allows the energy storage system to have a larger operating current and maintain a higher power without overcurrent.

In a possible implementation, the second threshold is 0. The second threshold is set to be 0, that is, if the maximum overcurrent value is not greater than 0, that is, if there is no overcurrent in each branch battery cluster of the energy storage system, the lowering of the total current limit value of the energy storage system stops, which can ensure the timely maintenance of a larger operating current after the problem of overcurrent of the energy storage system is eliminated.

In a possible implementation, regulating a total current limit value of the energy storage system according to the maximum overcurrent value comprises: if the maximum overcurrent value is less than a third threshold, increasing the total current limit value, wherein the third threshold is a preset value less than zero.

The setting of the third threshold can enable an increase in the total current limit value of the energy storage system if the maximum overcurrent value of the energy storage system is less than the third threshold. This allows the energy storage system to operate at a larger operating current without overcurrent.

In a possible implementation, increasing the total current limit value comprises: stepwise increasing the total current limit value until the maximum overcurrent value is not less than a fourth threshold, wherein the fourth threshold is greater than the third threshold.

In the implementation of increasing the total current limit value, a stepwise increasing method is used, so that the total current limit value of the energy storage system can be stepwise increased, avoiding a rapid increase of the total current limit value and causing damage to the performance of the battery cluster due to a rapid change of current in the energy storage system. As the total current limit value is increased, the maximum overcurrent value computed in real-time is also gradually increased. Setting up the fourth threshold can stop increasing the total current limit value if the maximum overcurrent value is greater than or equal to the fourth threshold. This can avoid overcurrent caused by an excessive increase in the total current limit value of the energy storage system.

In a possible implementation, the fourth threshold is −2 A. The fourth threshold is set to be −2 A to ensure that the energy storage system has a higher operating current while the excessive increase in the total current limit value of the energy storage system is avoided.

In a possible implementation, the overcurrent value of each battery cluster is a difference value by subtracting from the current value of each battery cluster the overcurrent capability of each battery cluster.

In a second aspect, provided is an energy storage system, comprising: a plurality of battery clusters, the plurality of battery clusters being connected in parallel; a plurality of current sensors configured to respectively obtain a current value of each battery cluster in the plurality of battery clusters; a plurality of sub-control units configured to obtain, from the plurality of current sensors, the current value of each battery cluster in the plurality of battery clusters; and a total control unit configured to regulate a total current limit value of the energy storage system according to the maximum overcurrent value from the overcurrent values of the plurality of battery clusters, wherein the overcurrent value of each battery cluster is determined according to the current value of each battery cluster and overcurrent capability of each battery cluster.

In a possible implementation, the total control unit is configured to, if the maximum overcurrent value is greater than a first threshold, lower the total current limit value, wherein the first threshold is a preset value greater than zero.

In a possible implementation, the total control unit is configured to stepwise lower the total current limit value until the maximum overcurrent value is not greater than a second threshold, wherein the second threshold is less than the preset value of the first threshold.

In a possible implementation, the second threshold is 0.

In a possible implementation, the total control unit is configured to, if the maximum overcurrent value is less than a third threshold, increase the total current limit value, wherein the third threshold is a preset value less than zero.

In a possible implementation, the total control unit is configured to stepwise increase the total current limit value until the maximum overcurrent value is not less than a fourth threshold, wherein the fourth threshold is greater than the third threshold.

In a possible implementation, the fourth threshold is −2 A.

In a possible implementation, the overcurrent value of each battery cluster is a difference value by subtracting from the current value of each battery cluster the overcurrent capability of each battery cluster.

In a third aspect, provided is a device for overcurrent regulation of an energy storage system, the device comprising a processor and a memory, wherein the memory is configured to store a computer program, and the processor is configured to invoke the computer program, so that the device implements the method in the first aspect or any possible implementation of the first aspect.

In a fourth aspect, provided is a computer-readable storage medium configured to have stored thereon a computer program that, when executed by a computing device, allows the computing device to implement the method in the first aspect or any possible implementation of the first aspect.

BRIEF DESCRIPTION OF THE DRAWINGS

In order to illustrate the technical solutions of the embodiments of the present application more clearly, the accompanying drawings required in the embodiments of the present application will be described briefly below. Obviously, the accompanying drawings described below are merely some embodiments of the present application, and for those of ordinary skill in the art, other accompanying drawings can also be obtained from these accompanying drawings without any creative efforts.

In the accompanying drawings, the figures are not necessarily drawn to scale.

DETAILED DESCRIPTION OF EMBODIMENTS

In order to make the objectives, technical solutions and advantages of embodiments of the present application clearer, the technical solutions in the embodiments of the present application will be described clearly below with reference to the accompanying drawings in the embodiments of the present application. Obviously, the embodiments described are some of, rather than all of, the embodiments of the present application. Based on the embodiments of the present application, all other embodiments obtained by those of ordinary skill in the art without any creative effort fall within the scope of protection of the present application.

In the description of the present application, it should be noted that all technological and scientific terms used herein have the same meanings as those commonly understood by those skilled in the art to which the present application belongs. The terms used are merely for the purpose of describing specific embodiments, and are not intended to limit the present application. The terms "comprising" and "having" and any variations thereof in the specification and the claims of the present application and in the foregoing brief description of the drawings are intended to cover non-exclusive inclusions. The term "a plurality of" means two or more. The orientation or position relationship indicated by the terms "upper", "lower", "left", "right", "inner", "outer", etc. is only for the convenience of describing the present application and simplifying the description, rather than indicating or implying that the device or element referred to must have a particular orientation or be constructed and operated in a particular orientation, and therefore should not be construed as a limitation on the present application. In addition, the terms "first", "second", "third", etc. are used for descriptive purposes only, and should not be construed as indicating or implying the relative importance.

In the present application, the phrase "embodiment" mentioned means that the specific features, structures or characteristics described in conjunction with the embodiments may be included in at least one embodiment of the present application. The phrase at various locations in the description does not necessarily refer to the same embodiment, or an independent or alternative embodiment exclusive of another embodiment. Those skilled in the art should understand, in explicit and implicit manners, that an embodiment described in the present application may be combined with another embodiment.

The orientation terms in the following description all indicate directions shown in the accompanying drawings, but do not limit the specific structure in the present application. In the description of the present application, it should also be noted that the terms "mounting", "connect", and "connection" should be interpreted in the broad sense unless explicitly defined and limited otherwise. For example, the connection may be a fixed connection, a detachable connection, or an integral connection, or may be a direct connection, or an indirect connection by means of an intermediate medium. For those of ordinary skill in the art, the specific meanings of the terms mentioned above in the present application can be construed according to specific circumstances.

The term "and/or" in the present application is merely a description of the associated relationship of associated objects, representing that three relationships may exist, for example, A and/or B, may be expressed as: only A exists, both A and B exist, and only B exists. In addition, the character "/" in the present application generally indicates that the associated objects before and after the character are in a relationship of "or".

At present, an energy storage system is an important part in building a smart grid, which can effectively achieve electric energy management on a user side, improve system reliability and power quality, and suppress power fluctuations of renewable energy sources. In an energy storage system in which various battery clusters are connected in parallel, the current during charging and discharging processes is different due to different internal resistances of the battery clusters. Severe current imbalance of the battery clusters can cause the current of the battery cluster with a lower internal resistance to be higher, which can easily trigger overcurrent and cause the battery cluster to operate in an overcurrent state for a long time, increasing the risk of lithium precipitation in battery cells.

Currently, a method for regulating the current of battery clusters in parallel branches of an energy storage system is mainly achieved by setting up a direct-current converter (direct current, DC/DC) in each branch to individually control the current of each battery cluster in the branch. A feedback adjustment circuit of each branch is configured to monitor the overcurrent status of the battery cluster in the branch. If overcurrent occurs, the DC/DC converter in the branch can compensate for voltage to maintain the total voltage of different branches at the same level, thereby solving the problem of current imbalance between battery clusters in each branch. However, this method requires adding the DC/DC converter and the feedback adjustment circuit, which increases the integration cost of the system. Moreover, as the number of parallel branches in the system increases, the requirement for a collaborative processing capability of a parallel branch system becomes increasingly high.

In view of this, an embodiment of the present application provides a method for overcurrent regulation of an energy storage system. A total current limit value of the energy storage system is regulated according to the maximum overcurrent value of the battery clusters in parallel branches of the energy storage system. This method of regulating the total current limit value of the energy storage system according to the maximum overcurrent value does not require an additional hardware to regulate and control each battery cluster in each branch separately, reducing the integration cost of the system, and effectively solving the problem of overcurrent of the energy storage system.

Figure 1:
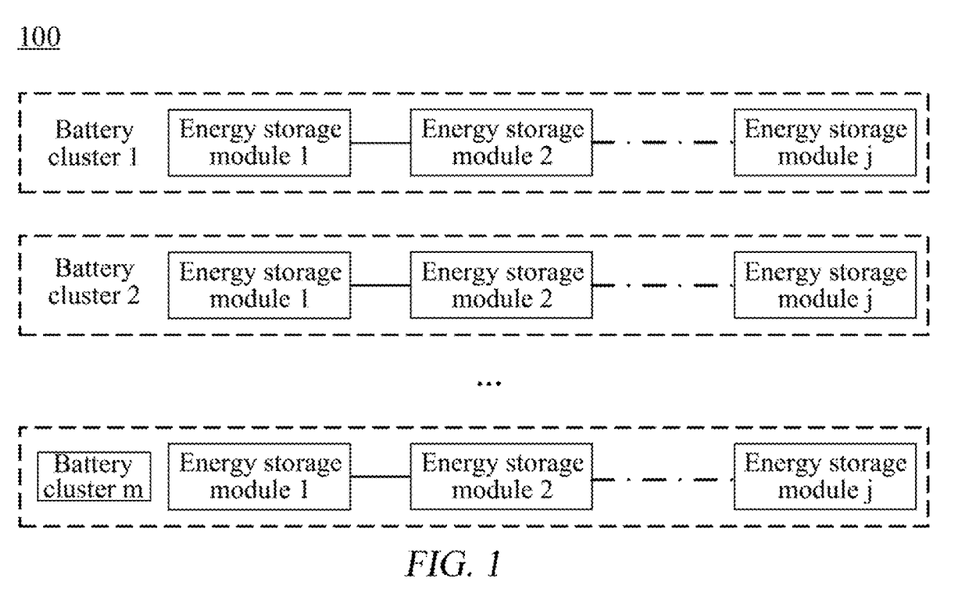
FIG. 1 is a schematic diagram of an energy storage system according to an embodiment of the present application.

FIG. 1 is a schematic diagram of an energy storage system 100 according to the present application.

The energy storage system 100 comprises a plurality of battery clusters, as shown in FIG. 1, from battery cluster 1 to battery cluster m, wherein m can be a natural number greater than 1. That is, in practical applications, the number of battery clusters can be flexibly adjusted according to the energy storage capacity. If the energy storage capacity is large, the number of battery clusters can be appropriately increased, and if the energy storage capacity is small, the number of battery clusters can be appropriately reduced.

Each battery cluster is composed of at least two battery energy storage modules (energy storage system, ESS) connected in series. As shown in FIG. 1, from energy storage module 1 to energy storage module j, where j can be a natural number greater than or equal to 2. Each energy storage module ESS is composed of several energy storage elements connected in series or in parallel, forming the minimum energy storage and management unit. To achieve the detection and control of the energy storage system, a battery management system (battery management system, BMS) is designed in each energy storage module and battery cluster to monitor battery information such as state of charge (state of charge, SOC), temperature, and current. Real-time information exchange is carried out with an upper-level energy management system (energy management system, EMS) or power conversion system (power convert system, PCS) to achieve effective management and control of the entire battery energy storage system.

Figure 2:
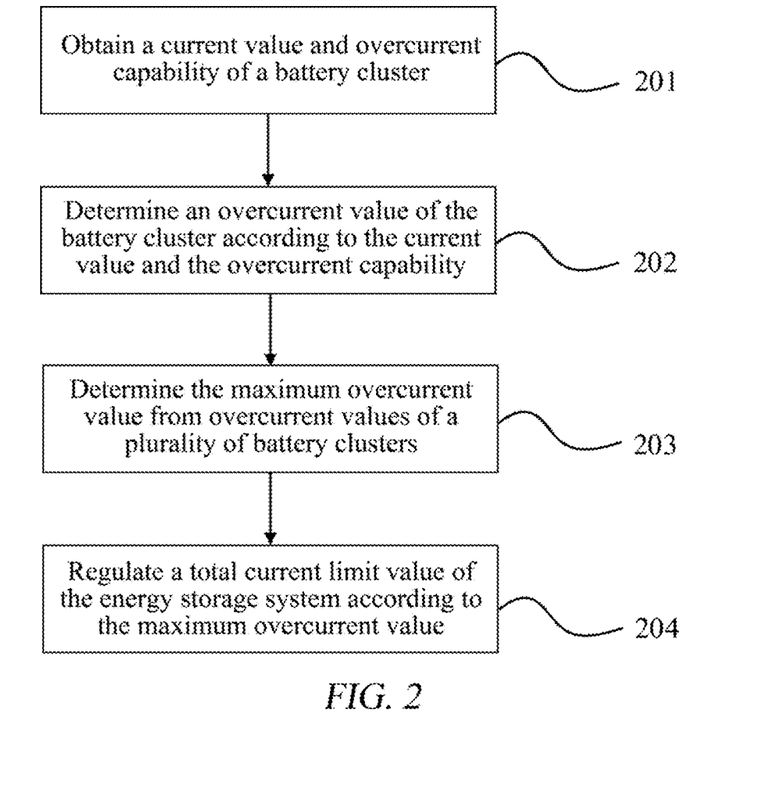
FIG. 2 is a schematic flowchart of a method for overcurrent regulation of an energy storage system according to an embodiment of the present application.

FIG. 2 is a schematic flowchart of a method for overcurrent regulation of an energy storage system according to an embodiment of the present application. The energy storage system comprises a plurality of battery clusters connected in parallel. For example, the energy storage system can be the energy storage system 100 in FIG. 1.

201, A current value and overcurrent capability of each battery cluster in a plurality of battery clusters are obtained.

The current value of the battery cluster can be obtained by a current sensor. The battery cluster in each branch is provided with the corresponding current sensor. For example, each battery cluster in each branch is connected in series with a current sensor, and the current sensor is in a one-to-one correspondence with the battery cluster and obtains the current value of each battery cluster.

The computation of overcurrent capability of the battery cluster can be obtained according to a parameter of the battery cluster itself. For example, based on parameters such as the temperature of the battery cluster, SOC, and battery state-of-health (state of health, SOH), the overcurrent capability of the battery cluster corresponding to specific values of the above parameters is obtained by looking up a table.

202, An overcurrent value of each battery cluster is determined according to the current value and the overcurrent capability.

For each battery cluster, the overcurrent value of same is determined according to the current value and the overcurrent capability thereof. For example, the overcurrent value of each battery cluster may be a difference value by subtracting from the current value of each battery cluster the overcurrent capability of each battery cluster.

203, The maximum overcurrent value is determined from overcurrent values of a plurality of the battery clusters.

The maximum overcurrent value is the maximum value from the overcurrent values of the plurality of battery clusters of the energy storage system.

204, A total current limit value of the energy storage system is regulated according to the maximum overcurrent value.

The regulation of the total current limit value of the energy storage system according to the maximum overcurrent value can be either lowering or increasing the total current limit value, which depends on the situation of the maximum overcurrent value and is adjusted dynamically. On this basis, the current of each battery cluster will change accordingly, so that the total current of the energy storage system tends to be the total current limit value, thereby achieving the purpose of regulating and controlling the current of each battery cluster.

In an embodiment of the present application, the total current limit value of the energy storage system is regulated according to the maximum overcurrent value of the battery cluster. In this way, when overcurrent occurs in the battery cluster of the energy storage system, the total current limit value can be lowered, so that the current of the battery cluster in each branch is also correspondingly lowered, thereby eliminating the problem of overcurrent of the battery cluster. At the same time, when the current of the energy storage system is low, the total current limit value can be increased to allow the energy storage system to have a larger operating current without overcurrent, thereby maintaining a higher power. This method of regulating the total current limit value of the energy storage system according to the maximum overcurrent value to solve the problem of overcurrent does not require an additional hardware to regulate and control the battery cluster in each branch separately, reducing the integration cost of the system, and effectively solving the problem of overcurrent of the energy storage system.

Figure 3:
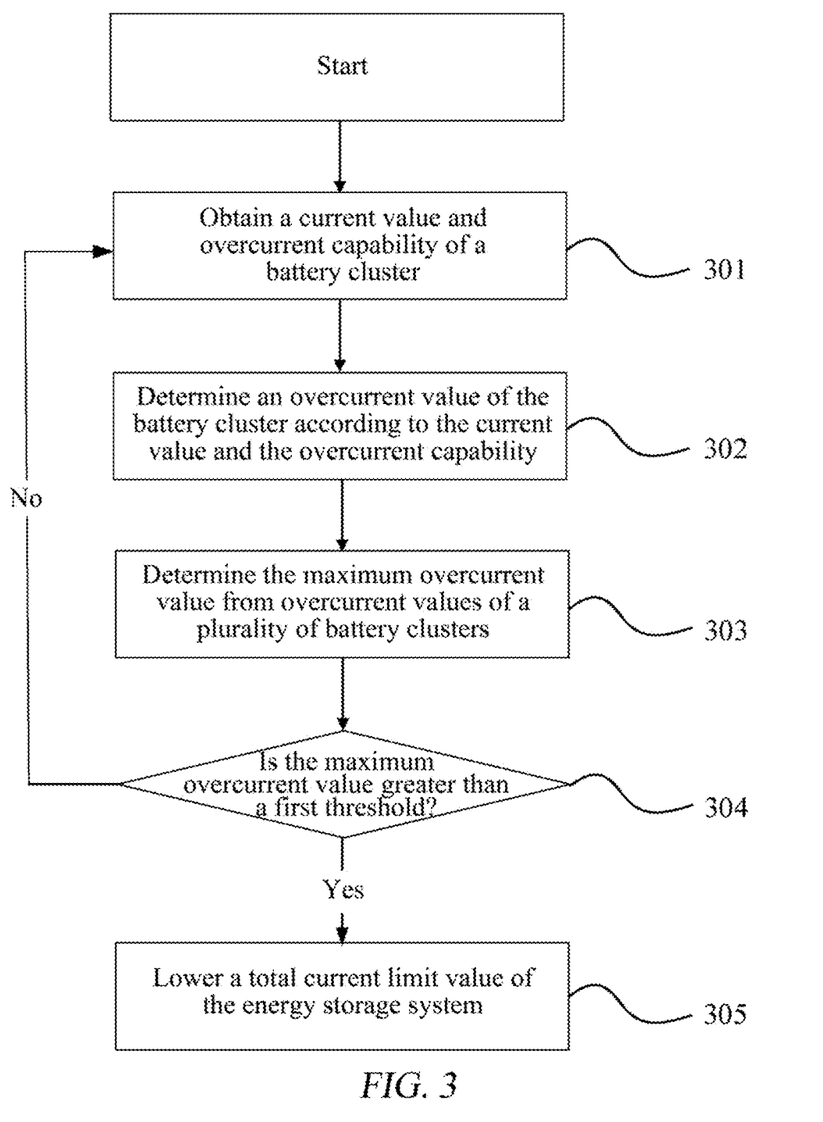
FIG. 3 is a schematic flowchart of a method for overcurrent regulation of an energy storage system according to another embodiment of the present application.

FIG. 3 is a schematic flowchart of a method for overcurrent regulation of an energy storage system according to another embodiment of the present application. 301-303 in FIG. 3 are similar to 201-203 in the previous embodiment, and reference can be made to the previous embodiment. For the sake of brevity, details are not described herein again.

304, Whether the maximum overcurrent value is greater than a first threshold is determined.

305, If the maximum overcurrent value is greater than the first threshold, the total current limit value of the energy storage system is lowered.

The first threshold refers to a first current parameter preset by the energy storage system, and can be a preset value greater than zero. If the maximum overcurrent value exceeds the first threshold, the total current limit value of the energy storage system is lowered. The current parameter of the first threshold may include a fixed value, a modifiable value, a value determined by looking up a table, and a value determined by a functional relationship, which will not be limited herein by the embodiments of the present application. The first threshold may be the maximum overcurrent value at which the battery cluster of the energy storage system does not suffer from overcurrent damage. For example, the first threshold may be 2 A. Therefore, the maximum overcurrent value of the battery cluster of the energy storage system may be controlled to be below 2 A.

If the maximum overcurrent value is determined to be greater than the first threshold, the total current limit value of the energy storage system is lowered. If the maximum overcurrent value is not greater than the first threshold, the total current limit value of the energy storage system is not lowered, and the current values of the battery clusters continue to be monitored.

In an embodiment of the present application, the total current limit value of the energy storage system is lowered according to the relationship between the maximum overcurrent value and the first threshold, and when overcurrent occurs in the battery cluster in the branch of the energy storage system and if the maximum overcurrent value exceeds the first threshold, the total current limit value of the energy storage system can be lowered to achieve overcurrent protection of the energy storage system.

Figure 4:
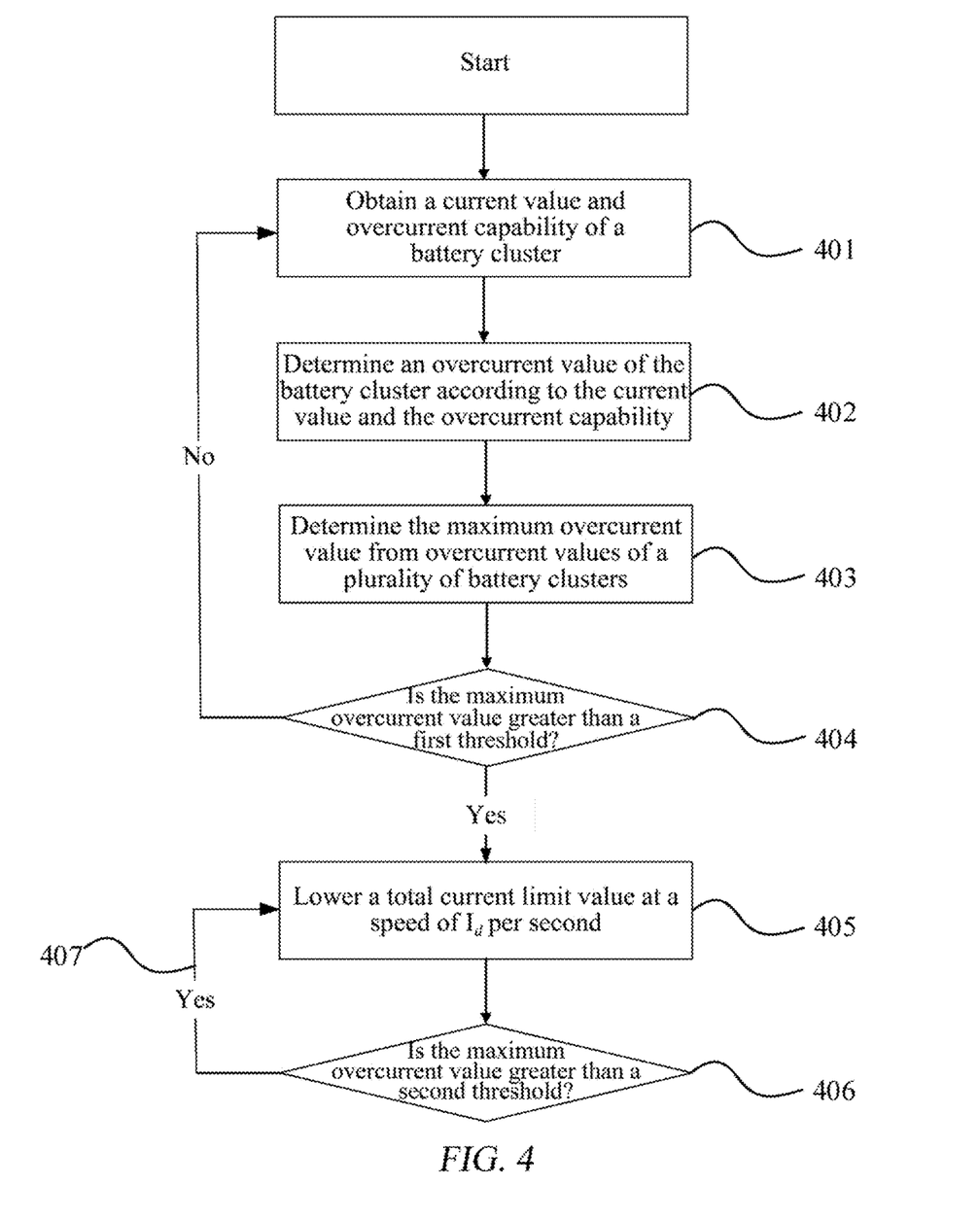
FIG. 4 is a schematic flowchart of a method for overcurrent regulation of an energy storage system according to an embodiment of the present application.

Optionally, in an embodiment of the present application, the total current limit value can be lowered in a stepwise lowering manner. Specifically, the total current limit value can be stepwise lowered until the maximum overcurrent value is not greater than the second threshold. Stepwise lowering the total current limit value means gradually lowering the total current limit value at a predetermined speed. Referring to FIG. 4, FIG. 4 is a schematic flowchart of a method for overcurrent regulation of an energy storage system according to an embodiment of the present application. 401-404 in FIG. 4 are similar to 301-304 in the previous embodiment, and reference can be made to the previous embodiment. For the sake of brevity, details are not described herein again.

405, If the maximum overcurrent value is greater than the first threshold, the total current limit value is lowered at a speed of $I_d$ per second.

$I_d$ represents the speed of stepwise lowering the total current limit value. The value of $I_d$ can be preset or adjusted in real time, which will not be limited herein by the embodiments of the present application.

406, Whether the maximum overcurrent value is greater than a second threshold is determined.

In the process of stepwise lowering the total current limit value, real-time monitoring of the maximum overcurrent value of the energy storage system is required. By setting up the second threshold, it is determined whether the energy storage system needs to continue to lower the total current limit value. That is, after the total current limit value is lowered each time, it is necessary to reacquire the current value and overcurrent capability of each battery cluster, and determine the overcurrent value and the corresponding maximum overcurrent value of each battery cluster, that is, to re-execute 401-403. It is then determined whether the maximum overcurrent value is greater than the second threshold.

407, If the maximum overcurrent value is greater than the second threshold, turning back to 405, the total current limit value continues to be lowered at the speed of $I_d$ per second.

The second threshold refers to a second current parameter, which is preset by the energy storage system and is less than the first threshold. For example, the second threshold may be 0. The current parameter of the second threshold may include a fixed value, a modifiable value, a value determined by looking up a table, and a value determined by a functional relationship, which will not be limited herein by the embodiments of the present application. If the maximum overcurrent value is not greater than the second threshold, lowering of the total current limit value of the energy storage system stops.

In an embodiment of the present application, a stepwise lowering method is used, so that the total current limit value of the energy storage system can be stepwise lowered, avoiding rapid lowering of the total current limit value and causing damage to the performance of the battery cluster due to a rapid change of current in the energy storage system. As the total current limit value is reduced, the maximum overcurrent value computed in real-time is also gradually reduced. Setting up the second threshold can stop lowering the total current limit value if the maximum overcurrent value is less than or equal to the second threshold. This allows the energy storage system to have a larger operating current and maintain a higher power without overcurrent.

Figure 5:
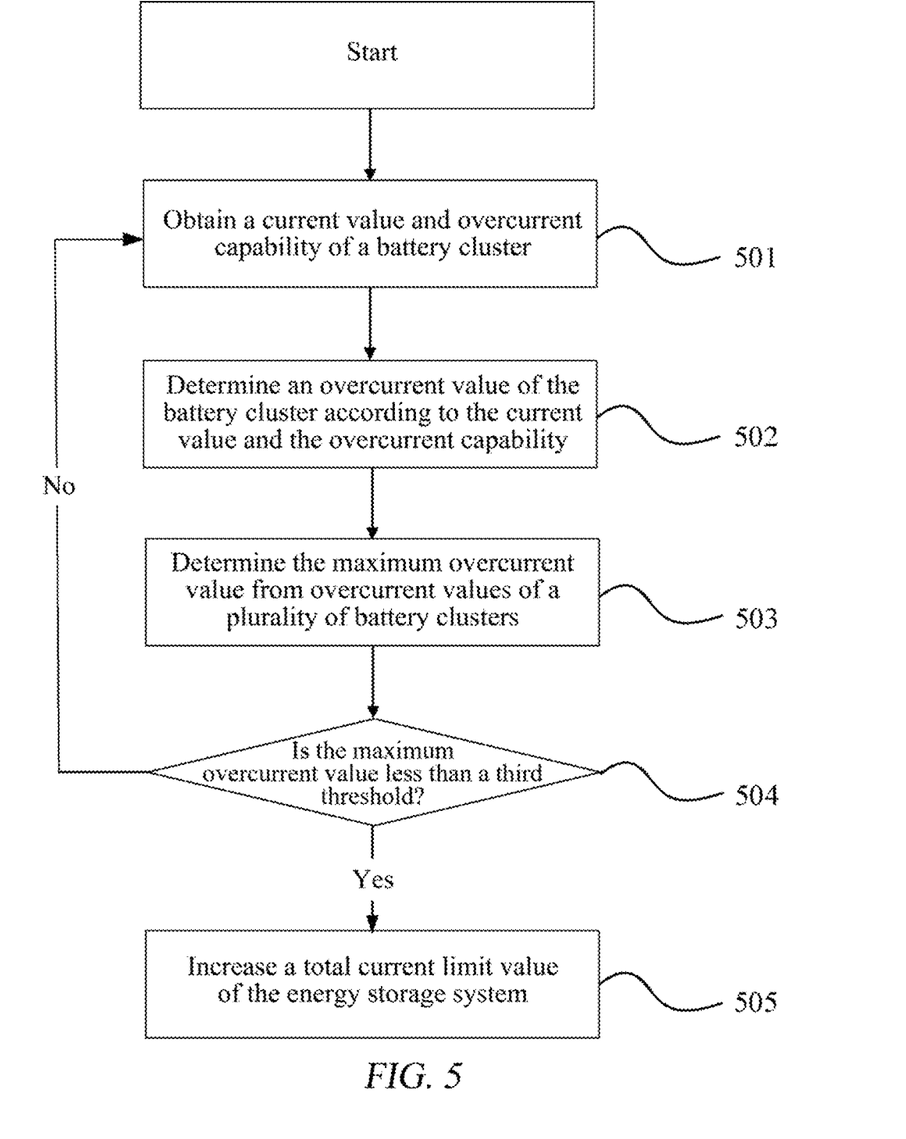
FIG. 5 is a schematic flowchart of a method for overcurrent regulation of an energy storage system according to another embodiment of the present application.

FIG. 5 is a schematic flowchart of a method for overcurrent regulation of an energy storage system according to another embodiment of the present application. 501-503 in FIG. 5 are similar to 401-403 in the previous embodiment, and reference can be made to the previous embodiment. For the sake of brevity, details are not described herein again.

504, Whether the maximum overcurrent value is less than a third threshold is determined.

506, If the maximum overcurrent value is less than the third threshold, the total current limit value of the energy storage system is increased.

The third threshold refers to a third current parameter preset by the energy storage system, and can be a preset value less than zero. If the maximum overcurrent value is less than the third threshold, the total current limit value of the energy storage system is increased. The current parameter of the third threshold may include a fixed value, a modifiable value, a value determined by looking up a table, and a value determined by a functional relationship, which will not be limited herein by the embodiments of the present application.

If the maximum overcurrent value is determined to be less than the third threshold, the total current limit value of the energy storage system is increased. If the maximum overcurrent value is not less than the third threshold, the total current limit value of the energy storage system is not increased, and the current values of the battery clusters continue to be monitored.

In an embodiment of the present application, the total current limit value of the energy storage system is increased according to the relationship between the maximum overcurrent value and the third threshold, and when no overcurrent occurs in the battery cluster in the branch of the energy storage system and if the maximum overcurrent value is less than the third threshold, the total current limit value of the energy storage system can be increased, so that the energy storage system has a larger operating current, thereby maintaining a higher power.

Figure 6:
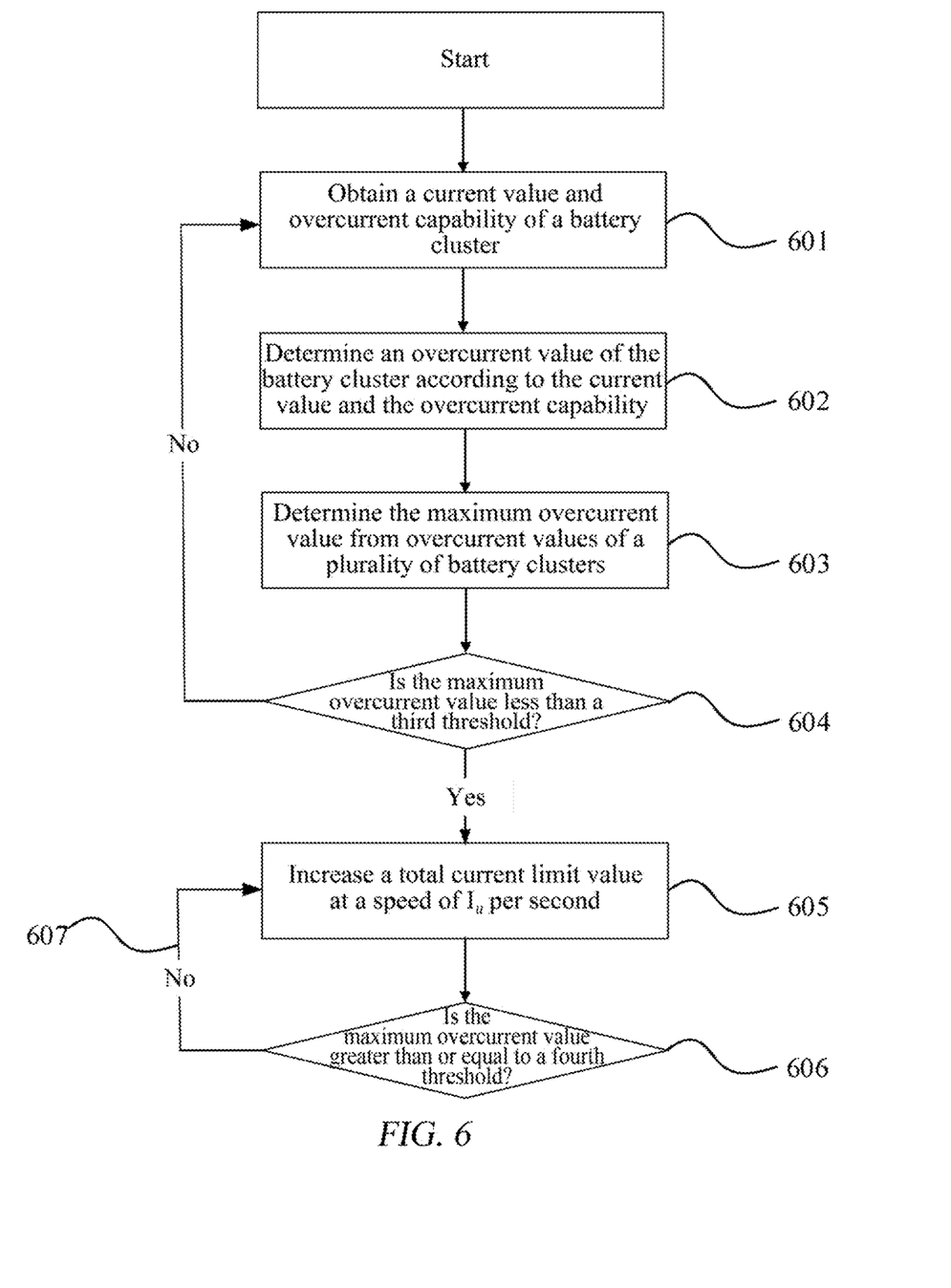
FIG. 6 is a schematic flowchart of a method for overcurrent regulation of an energy storage system according to an embodiment of the present application.

Optionally, in an embodiment of the present application, the total current limit value can be increased in a stepwise increasing manner. Specifically, the total current limit value can be stepwise increased until the maximum overcurrent value is not less than a fourth threshold. Stepwise increasing the total current limit value means gradually increasing the total current limit value at a predetermined speed. Referring to FIG. 6, FIG. 6 is a schematic flowchart of a method for overcurrent regulation of an energy storage system according to an embodiment of the present application. 601-604 in FIG. 6 are similar to 501-504 in the previous embodiment, and reference can be made to the previous embodiment. For the sake of brevity, details are not described herein again.

605, If the maximum overcurrent value is less than the third threshold, the total current limit value is increased at a speed of $I_u$ per second.

$I_u$ represents the speed of stepwise increasing the total current limit value. The value of $I_u$ can be preset or adjusted in real time, which will not be limited herein by the embodiments of the present application.

606, Whether the maximum overcurrent value is not less than a fourth threshold is determined.

In the process of stepwise increasing the total current limit value, real-time monitoring of the maximum overcurrent value of the energy storage system is required. By setting up the fourth threshold, it is determined whether the energy storage system needs to continue to increase the total current limit value. That is, after the total current limit value is increased each time, it is necessary to reacquire the current value and overcurrent capability of each battery cluster, and determine the overcurrent value and the corresponding maximum overcurrent value of each battery cluster, that is, to re-execute 601-603. It is then determined whether the maximum overcurrent value is not less than the fourth threshold.

607, If the maximum overcurrent value is less than the fourth threshold, turning back to 605, the total current limit value continues to be increased at the speed of $I_u$ per second.

The fourth threshold refers to a fourth current parameter, which is preset by the energy storage system and is greater than the third threshold. For example, the fourth threshold may be −2 A. The current parameter of the fourth threshold may include a fixed value, a modifiable value, a value determined by looking up a table, and a value determined by a functional relationship, which will not be limited herein by the embodiments of the present application. If the maximum overcurrent value is not less than the fourth threshold, an increase in the total current limit value of the energy storage system stops.

In an embodiment of the present application, a stepwise increasing method is used, so that the total current limit value of the energy storage system can be stepwise increased, avoiding a rapid increase of the total current limit value and causing damage to the performance of the battery cluster due to a rapid change of current in the energy storage system. As the total current limit value is increased, the maximum overcurrent value computed in real-time is also gradually increased. Setting up the fourth threshold can stop increasing the total current limit value if the maximum overcurrent value is greater than or equal to the fourth threshold. This can avoid overcurrent caused by an excessive increase in the total current limit value of the energy storage system.

The method for overcurrent regulation of an energy storage system according to the embodiments of the present application is described above, and the energy storage system according to the embodiments of the present application will be described below. For the parts not described in detail, reference may be made to the foregoing embodiments.

Figure 7:
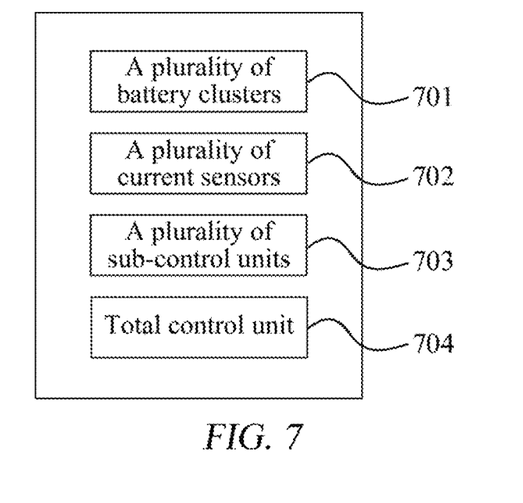
FIG. 7 is a schematic diagram of an energy storage system according to an embodiment of the present application.

FIG. 7 is a schematic diagram of an energy storage system according to an embodiment of the present application. In an embodiment of the present application, the energy storage system may comprise a plurality of battery clusters 701, a plurality of current sensors 702, a plurality of sub-control units 703, and a total control unit 704.

The plurality of battery clusters 701 are connected in parallel.

The plurality of current sensors 702 may be configured to respectively obtain the current value of each battery cluster 701 in the plurality of battery clusters.

The plurality of sub-control units 703 may be configured to obtain, from the plurality of current sensors 702, the current value of each battery cluster 701 in the plurality of battery clusters.

The total control unit 704 may be configured to regulate the total current limit value of the energy storage system according to the maximum overcurrent value from the overcurrent values of the plurality of battery clusters 701. The overcurrent value of each battery cluster is determined according to the current value of each battery cluster and the overcurrent capability of each battery cluster. For example, the overcurrent value of each battery cluster may be a difference value by subtracting from the current value of each battery cluster the overcurrent capability of each battery cluster.

In some embodiments of the present application, the total control unit 704 lowers the total current limit value if the maximum overcurrent value is greater than the first threshold, wherein the first threshold is a preset value greater than zero. For example, the first threshold may be 2 A.

In some embodiments of the present application, the total control unit 704 stepwise lowers the total current limit value if the maximum overcurrent value is greater than the first threshold until the maximum overcurrent value is not greater than a second threshold, wherein the second threshold is less than the first threshold. For example, the second threshold may be 0.

In some embodiments of the present application, the total control unit 704 increases the total current limit value if the maximum overcurrent value is less than a third threshold, wherein the third threshold is a preset value less than zero.

In some embodiments of the present application, the total control unit 704 stepwise increases the total current limit value if the maximum overcurrent value is less than the third threshold until the maximum overcurrent value is not less than a fourth threshold, wherein the fourth threshold is greater than the third threshold. For example, the fourth threshold may be −2 A.

An embodiment of the present application further provides a device for overcurrent regulation of an energy storage system, the device comprising a processor and a memory, wherein the memory is configured to store a computer program, and the processor is configured to invoke the computer program, so that the device implements the method in the various embodiments of the present application.

An embodiment of the present application further provides a computer-readable storage medium configured to have stored thereon a computer program that, when executed by a computing device, allows the computing device to implement the method according to various embodiments of the present application.

While the present application has been described with reference to some embodiments, various modifications can be made, and equivalents can be provided to substitute for the components thereof without departing from the scope of the present application. In particular, the technical features mentioned in the embodiments can be combined in any manner, provided that there is no structural conflict. The present application is not limited to the specific embodiments disclosed herein but includes all the technical solutions that fall within the scope of the claims.

What is claimed is:

1. A method for overcurrent regulation of an energy storage system, wherein the energy storage system comprises a plurality of battery clusters connected in parallel, the method comprising:
   obtaining a current value and overcurrent capability of each battery cluster in the plurality of battery clusters;
   determining an overcurrent value of each battery cluster according to the current value and the overcurrent capability;
   determining a maximum overcurrent value from the overcurrent values of the plurality of battery clusters; and
   regulating a total current limit value of the energy storage system according to the maximum overcurrent value, comprising:
      in response to the maximum overcurrent value being greater than a first threshold, lowering the total current limit value to lower the current value of each battery cluster in the plurality of battery clusters without individually controlling the each battery cluster in the plurality of battery clusters, the first threshold being a preset value greater than zero.

2. The method according to claim 1, wherein lowering the total current limit value comprises:
   stepwise lowering the total current limit value until the maximum overcurrent value is not greater than a second threshold, wherein the second threshold is less than the preset value of the first threshold.

3. The method according to claim 2, wherein the second threshold is 0.

4. The method according to claim 1, wherein regulating the total current limit value of the energy storage system according to the maximum overcurrent value further comprises:
   in response to the maximum overcurrent value being less than a third threshold, increasing the total current limit value, wherein the third threshold is a preset value less than zero.

5. The method according to claim 4, wherein increasing the total current limit value comprises:
   stepwise increasing the total current limit value until the maximum overcurrent value is not less than a fourth threshold, wherein the fourth threshold is greater than the third threshold.

6. The method according to claim 5, wherein the fourth threshold is −2 A.

7. The method according to claim 1, wherein the overcurrent value of each battery cluster is a difference value by subtracting from the current value of each battery cluster the overcurrent capability of each battery cluster.

8. A device for overcurrent regulation of an energy storage system, comprising a processor and a memory, wherein the memory is configured to store a computer program, and the processor is configured to invoke the computer program such that the device implements the method according to claim 1.

9. An energy storage system, comprising:
   a plurality of battery clusters, the plurality of battery clusters being connected in parallel;
   a plurality of current sensors configured to respectively obtain a current value of each battery cluster in the plurality of battery clusters;
   a plurality of sub-control units configured to obtain, from the plurality of current sensors, the current value of each battery cluster in the plurality of battery clusters; and a total control unit configured to regulate a total current limit value of the energy storage system according to a maximum overcurrent value from the overcurrent values of the plurality of battery clusters, wherein the overcurrent value of each battery cluster is determined according to the current value of each battery cluster and overcurrent capability of each battery cluster, and regulating the total current limit value of the energy storage system according to the maximum overcurrent value comprises:
  in response to the maximum overcurrent value being greater than a first threshold, lowering the total current limit value to lower the current value of each battery cluster in the plurality of battery clusters without individually controlling the each battery cluster in the plurality of battery clusters, the first threshold being a preset value greater than zero.

10. The energy storage system according to claim 9, wherein the total control unit is further configured to stepwise lower the total current limit value until the maximum overcurrent value is not greater than a second threshold, wherein the second threshold is less than the preset value of the first threshold.

11. The energy storage system according to claim 10, wherein the second threshold is 0.

12. The energy storage system according to claim 9, wherein the total control unit is further configured to, in response to the maximum overcurrent value being less than a third threshold, increase the total current limit value, wherein the third threshold is a preset value less than zero.

13. The energy storage system according to claim 12, wherein the total control unit is further configured to stepwise increase the total current limit value until the maximum overcurrent value is not less than a fourth threshold, wherein the fourth threshold is greater than the third threshold.

14. The energy storage system according to claim 13, wherein the fourth threshold is −2 A.

15. The energy storage system according to claim 9, wherein the overcurrent value of each battery cluster is a difference value by subtracting from the current value of each battery cluster the overcurrent capability of each battery cluster.

16. A method for overcurrent regulation of an energy storage system, wherein the energy storage system comprises a plurality of battery clusters connected in parallel, the method comprising:
  obtaining a current value and overcurrent capability of each battery cluster of the plurality of battery clusters;
  obtaining an overcurrent capability of each battery cluster of the plurality of battery clusters by looking up a table to obtain the overcurrent capability of the each battery cluster corresponding to a temperature of the each battery cluster, an SOC of the each battery cluster, and state-of-health (SOH) of the each battery cluster;
  determining an overcurrent value of each battery cluster according to the current value and the overcurrent capability;
  determining a maximum overcurrent value from among the overcurrent values of the plurality of battery clusters; and
  regulating a total current limit value of the energy storage system according to the maximum overcurrent value.

* * * * *